(12) United States Patent
Tristano et al.

(10) Patent No.: US 7,945,368 B2
(45) Date of Patent: May 17, 2011

(54) METHOD OF ADJUSTING AN AUTOMATIC PARKING BRAKE

(75) Inventors: Nicola Tristano, Matera (IT); Corrado Caruso, Bari (IT); Monika Schefzik, Santo Spirito (Bari) (IT)

(73) Assignee: Robert Bosch GmbH, Stuttgart (DE)

( * ) Notice: Subject to any disclaimer, the term of this patent is extended or adjusted under 35 U.S.C. 154(b) by 598 days.

(21) Appl. No.: 12/089,233

(22) PCT Filed: Oct. 4, 2006

(86) PCT No.: PCT/EP2006/009587
§ 371 (c)(1),
(2), (4) Date: Apr. 4, 2008

(87) PCT Pub. No.: WO2007/039283
PCT Pub. Date: Apr. 12, 2007

(65) Prior Publication Data
US 2008/0269999 A1   Oct. 30, 2008

(30) Foreign Application Priority Data
Oct. 5, 2005   (FR) .................................... 05 10155

(51) Int. Cl.
*G06F 7/00* (2006.01)
*G06F 17/00* (2006.01)
*G05D 1/00* (2006.01)

(52) U.S. Cl. ........... 701/78; 701/70; 701/83; 188/24.14; 188/24.18

(58) Field of Classification Search .................... 701/70, 701/78, 83; 188/24.14, 24.15, 24.12, 24.18
See application file for complete search history.

(56) References Cited

U.S. PATENT DOCUMENTS

| 3,983,975 A | 10/1976 | Wright |
| 2005/0252736 A1 | 11/2005 | Leiter et al. |
| 2007/0198145 A1* | 8/2007 | Norris et al. ................ 701/23 |

FOREIGN PATENT DOCUMENTS

| EP | 0866236 A1 | 9/1998 |
| EP | 1498633 A1 | 1/2005 |
| JP | 2000297833 | 10/2000 |
| WO | 2005/070736 A2 | 8/2005 |

OTHER PUBLICATIONS

PCT/EP2006/009587 International Search Report.

* cited by examiner

*Primary Examiner* — Gertrude Arthur Jeanglaud
(74) *Attorney, Agent, or Firm* — Michael Best & Friedrich LLP (57) ABSTRACT

A method of actuating an automatic parking brake for a vehicle, comprising a spring device, designed to absorb the actuating forces, situated in the actuating mechanism of a brake device. This method comprises at least the following steps: application of a preload to the spring device to a value situated in part IV of the operating characteristic, and adjustment of this preload to a level corresponding at least to a minimum braking force required for the vehicle.

16 Claims, 6 Drawing Sheets

METHOD OF ADJUSTING AN AUTOMATIC PARKING BRAKE

BACKGROUND OF THE INVENTION

The invention relates to a method of compensating for the cooling of an automatic parking brake and a system employing this method.

In a vehicle equipped with an automatic parking brake system, it is common practice for the brake to be brought into operation while the brake components are hot or even at a relatively high temperature. These components are therefore in an expanded state when the automatic parking brake system is applied.

In a vehicle where the parking brake acts on a disk brake system, it is the disk and brake pads which are hot. Following application of the automatic parking brake, when the vehicle is at rest, the disk and brake pads cool down and shrink. The braking force decreases in step with the contraction of the pads and disk.

This can result in a loss of braking pressure and can even release the vehicle. In some systems the braking force applied by the automatic parking brake takes this cooling into account and applies, while the brake device is hot, a braking force greater than that necessary to immobilize the vehicle. Some systems also provide for the brakes to be applied again after the brake disk and pads have cooled down.

In vehicles in which the automatic parking brake acts on a drum brake, heating has the effect of expanding the drum. As the drum cools, its volume decreases and the inside diameter of the braking surface decreases. After application of an automatic parking brake, and cooling of the drum brake, this decrease in diameter has the effect of increasing the braking pressure. The situation is therefore the reverse of that which occurs in systems where the automatic parking brake acts on a disk brake, because the braking force increases as the drum cools.

Automatic parking brake circuits usually have at least one function for indirectly measuring the braking force, for example by measuring the current supplied to the electric motor which actuates the parking brake system. In the absence of a direct force sensor capable of measuring the applied braking force, this force must be estimated by means of an indirect force measurement function (measuring the current supplied to the electric motor).

However, this measurement depends on several parameters (such as temperature, friction and the influence of speed). The braking force can therefore only be estimated in an approximate way.

Therefore, since it is vital that the braking force applied to the vehicle should not fall below a minimum under any conditions of braking and parking, it is acceptable to have a braking force greater than that theoretically necessary.

SUMMARY OF THE INVENTION

The invention relates to a system capable of avoiding this force increase applied to the brake devices by an automatic parking brake.

The invention therefore relates to a method of actuating an automatic parking brake for a vehicle. This brake comprises a spring device, designed to absorb the actuating forces, situated in the actuating mechanism of a brake device. According to the invention this method comprises at least the following steps: application of a preload to said spring device, adjustment of this preload to a level corresponding at least to a minimum braking force required for said vehicle and preferably approximately equal to this braking force.

Advantageously this method comprises: a step of indirectly measuring the brake actuating force, and a step of locking the parking brake when said brake actuating force is greater than a force whose value is equivalent to said preload.

In addition, this method may comprise the following steps: a step of measuring the displacement of the spring device, and a step of locking the operation of the automatic parking brake when said displacement reaches a defined value.

The method may optionally also include limiting the travel of the spring device to a value chosen to produce a defined value of the locking force.

In one embodiment of the invention, the automatic parking brake is controlled by an electric brake. The step of measuring the braking force is then carried out by measuring the current supplied to said electric motor.

The invention also employs a step of generating the curve of the actuating force communicated to the brake device as a function of the travel of the actuating device.

The method of the invention then comprises a step of monitoring the slopes of said curve to ensure that the changes of slope occur at the moments when the applied force is equal either to the preload force or to the force equal to maximum compression of the spring device.

This method also advantageously involves calculating and storing in memory the ratio between the values of the actuating forces communicated to the brake device measured at the changes of slope of said curve.

The method may then involve, when the parking brake is actuated, measuring the actuating forces communicated to the brake device at the changes of slope of said curve, and comparing the ratio between these values with said stored ratio.

The invention also relates to an automatic parking brake system applying the method described above. This system comprises at least one brake device controlled by a cable. A spring device is inserted into the actuating mechanism of said brake device, and the spring device is preloaded to a force corresponding to the required minimum braking force.

In one embodiment of the invention, the brake device on which said parking brake acts is a disk brake.

In another embodiment of the invention, the brake device on which said parking brake acts is a drum brake.

In a system that comprises at least one cable for transmitting the brake actuations to said brake device, said spring device is advantageously inserted into said cable.

In this embodiment, the spring device may comprise a cylindrical jacket containing a spring situated on the axis of the jacket between a first end and a second end of the jacket. The first end possesses a plug through which the cable and the cable sheath end pass. The spring bears against an axially moveable washer which itself bears against the plug or against said end of the sheath, the plug or the sheath forming a first stop. The second end of the jacket possesses an axially moveable cover for adjusting the spring preload in conjunction with the first stop.

A useful embodiment has the cover screwed onto the second end of the jacket.

Additionally, the jacket advantageously comprises a second stop making it possible to limit the displacement of the washer in compression mode.

In another embodiment, the spring device is inserted into the disk brake piston.

The spring device then also comprises a first stop for defining the preload.

It also comprises a second stop which limits the travel of the spring device.

BRIEF DESCRIPTION OF THE DRAWINGS

The various aspects and features of the invention will be made clear by the following description and by the accompanying figures, which show:

FIGS. 3a-3c: the operation of a two-stop spring element in a disk brake system:

FIGS. 4a-4c: the operation of a one-stop spring element in a disk brake system:

DETAILED DESCRIPTION

The object of the invention is to compensate for the thermal relaxation and hence the changes of volumes of the components of a brake device as it cools after the automatic parking brake has applied an immobilizing braking force to the vehicle to park it.

The method of the invention therefore requires applying only a very small force on top of the minimum vehicle-immobilizing force, so that only a small increase in the braking force is necessary to compensate, in a disk brake, for the loss of braking force during cooling or, in a drum brake, to compensate for the increase in the braking force.

Additionally, this device enables the applied braking force to be evaluated precisely.

The invention is applicable to an automatic parking brake system comprising a spring device capable of storing the system's braking energy.

Figure 1:
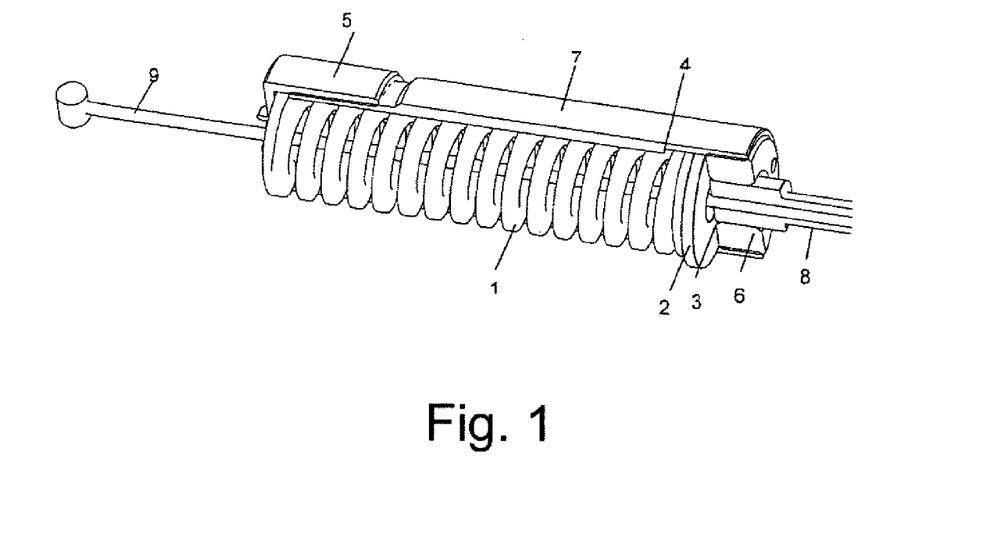
FIG. 1: an illustrative embodiment of a spring device connected into a parking brake actuating cable and capable of applying at least a preload force to a brake system.

This is done with a washer acting on a spring element and able to move into abutment, for example as shown in FIG. 1 and as will be described below.

The invention employs a prior loading known as the preload of the spring device. This preload is equal to the required braking force and is adjusted with the necessary degree of accuracy.

In a vehicle in which the automatic parking brake acts on disk brakes, when the parking brake fitted with a spring device thus adjusted in accordance with the invention is applied, only when the minimum required braking force (which therefore corresponds to the preload of the spring device) is reached does the spring begin to act in the parking brake mechanism. The consequence of this process is a significant change in the elasticity of the control system. The applied force is then increased until the compression of the spring device reaches a defined value.

Automatic parking brake systems also possess a system for indirectly measuring the force transmitted to the brake devices. For example, they may have a system for measuring the current supplied to the actuating electric motor.

Because of the significant change in the elasticity of the actuating force transmission system due to the preload of the spring device, this point of operation is easily identifiable in the force measurement curve.

As will be seen later in the description of FIGS. 3-5, this will allow an accurate reading of the amount of force reached by the compression mentioned above of the spring device.

During the thermal relaxation due to the cooling of the brake device, the spring device stretches but maintains the required minimum braking force because of the preload preset into it.

The preload of the spring device and its elasticity are stable over time. This allows control of braking and a relatively accurate estimate of the braking force under all conditions of operation with compensation for the thermal relaxation due to cooling without requiring the use of pressure sensors.

The invention is also applicable to a system in which the automatic parking brake acts on a drum brake. The invention also provides a spring device preloaded to the value of the required minimum braking force. When the required braking force, which therefore corresponds to the preload of the spring device, is reached the spring begins to act in the parking brake mechanism. The consequence of this is a significant change in the elasticity of the actuating system. This point of change is easily identifiable as before by measuring the force, even by an indirect measurement such as a measurement of the current supplied to the motor used by the parking brake. When this point of operation is exceeded, parking brake operation can be locked.

During the thermal relaxation and particularly during the cooling of the drum, the parking brake actuating system acts in the elasticity region of the spring device. The spring device will therefore become compressed and limit the increase in the braking force.

As before, the preload of the spring device and its elasticity are stable over time. This allows control of braking and a relatively accurate measurement of the braking force under all the conditions of operation with compensation for thermal relaxation.

The accurate evaluation of the braking force increases the reliability of the application of the parking brake under all conditions of operation.

Figure 2:
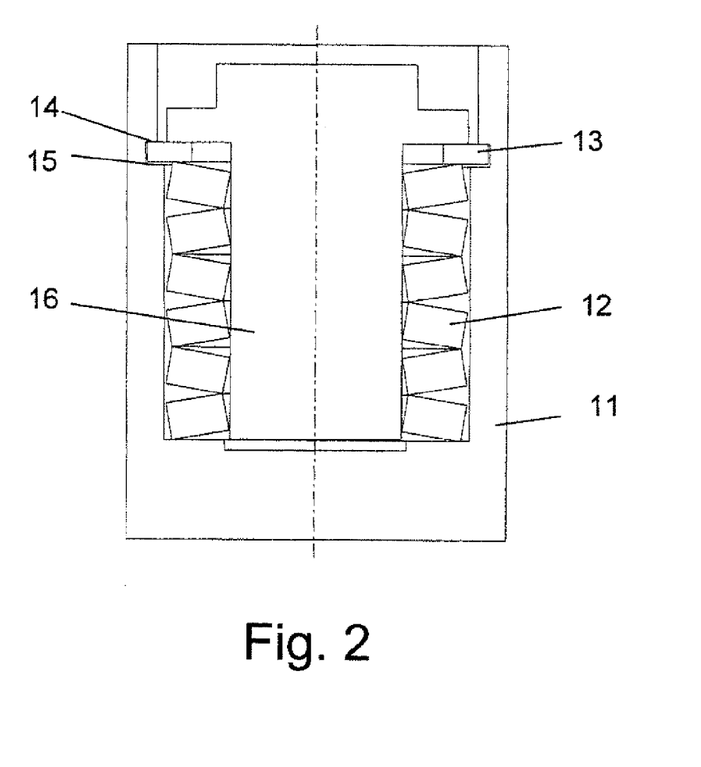
FIG. 2: a spring device inserted into a disk brake piston.

Referring to FIGS. 1 and 2, examples showing how the spring devices usable in accordance with the invention may be constructed will now be described. The springs used may be diaphragm springs, leaf springs, helical springs, packets of these springs or a combination of different springs.

FIG. 1 shows an example of an embodiment of a spring device usable in an automatic parking brake. It is equally applicable to a parking brake acting on a disk brake as to a parking brake acting on a drum brake.

This device comprises a helical spring 1 contained in a cylindrical jacket 7. A washer 2 can move axially between the two stops 3 and 4, where the second stop 4 is optional. The preload of the spring device is adjusted by means of the threaded cap 5, while the travel of the washer 2 can be adjusted by using the threaded ferrule 6.

The device with the housing 7 is connected into the parking brake cable 9. The sheath 8 containing the cable 9 runs through the ferrule 6 and bears against the washer 2.

The preload of the spring 1 is adjusted by adjusting the distance between the cap 5 and the washer 2, which bears against the stop 3, in other words by screwing the cap 5 backwards or forwards along the housing 7.

The travel of the compression of the spring can also be limited by limiting the travel of the washer 2 by means of the stop 4.

The device is applied to the parking brake mechanism between the device producing the parking brake force and the brake device (brake pads).

This spring device may be a single independent component positioned for example on the parking brake cable, at any location of the sheath containing this cable. Alternatively, the spring device with its stops may be integrated into a component of the mechanism for example the cable traction device.

FIG. 1 shows an example of the spring device in the form of an independent component.

In this example the device possesses two stops 3 and 4. It is connected into the parking brake cable and acts on the cable duct where the force is equal to the force on the parking brake cable.

In a disk brake, the spring device may also be inserted into the brake fluid chamber, for example inside the brake piston, but in such a way that it is decoupled from the mechanism of the service brake. An example of such a spring device is shown in FIG. 2.

The spring device 12 is mounted directly inside the brake disk 11. The washer 13 moves axially between the two stops 14 and 15, of which the second stop 15 is optional. While the parking brake is on, the applied force is communicated, in this particular embodiment, from the part 16 via the washer 13 and the spring 12 to the brake disk 11.

Notice that when the service brake is on, the part 16 and the washer 14 are not in contact and the spring device does not influence the service brake mechanism.

Whatever type of spring device is used, the preload applied to the spring is equal, in the invention, to the minimum braking force required to keep a parked vehicle immobile regardless of the conditions under which the vehicle is braked.

The method of the invention therefore involves preloading the spring to a load value equal to the minimum force exerted on the brake devices to guarantee that the vehicle will not move.

Figure 3A:
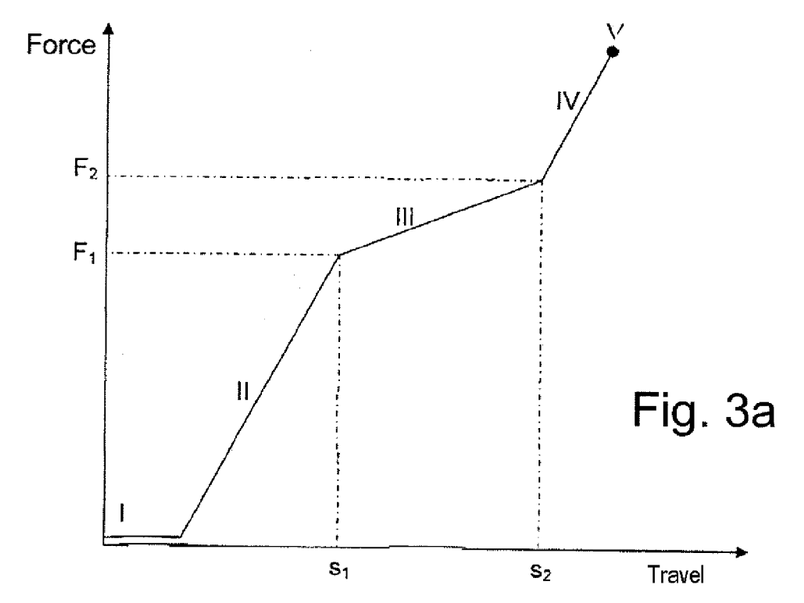
FIG. 3a illustrating the intervention of the spring device.
Figure 3B:
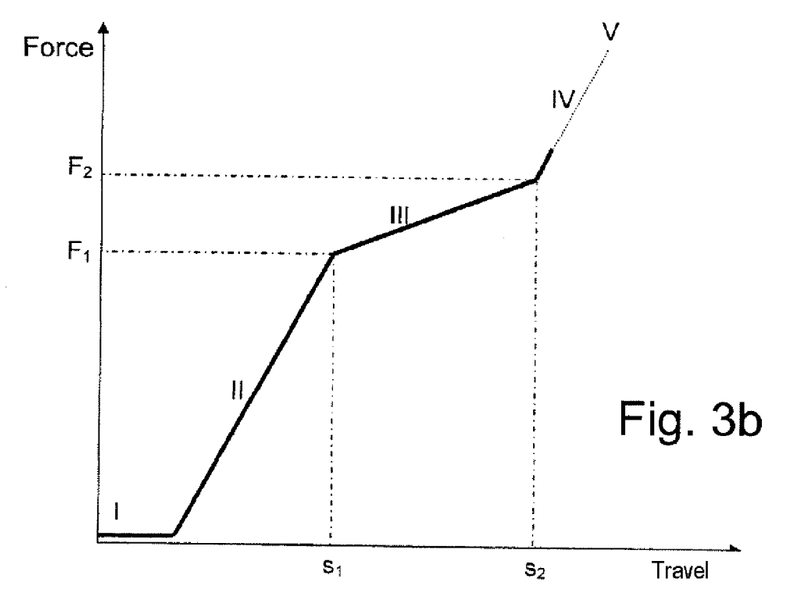
FIG. 3b illustrating the behavior during the locking cycle, and FIG. 3c illustrating the behavior during cooling of the brake system.
Figure 3C:
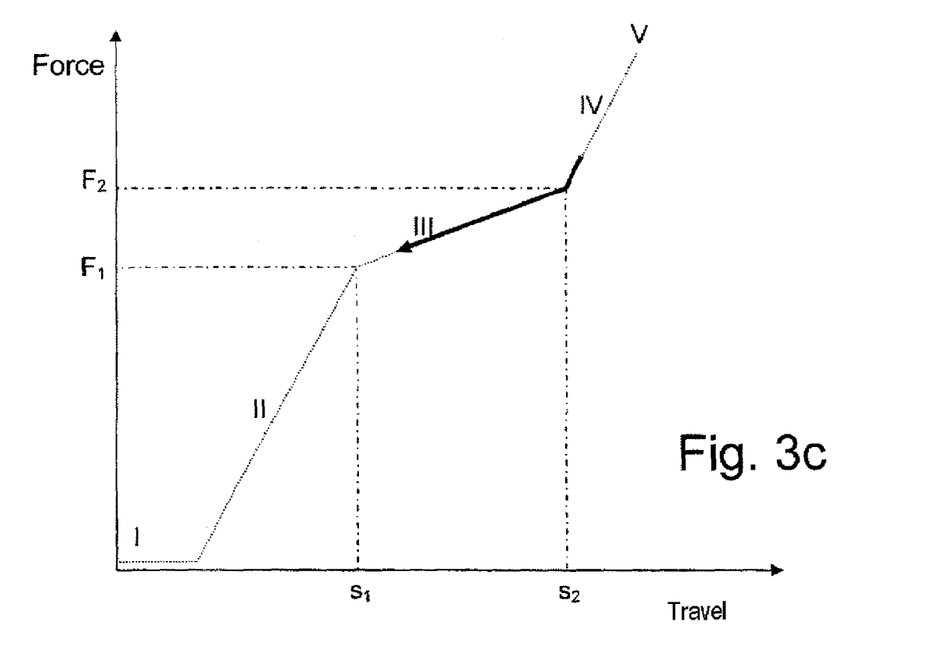
Figure 4A:
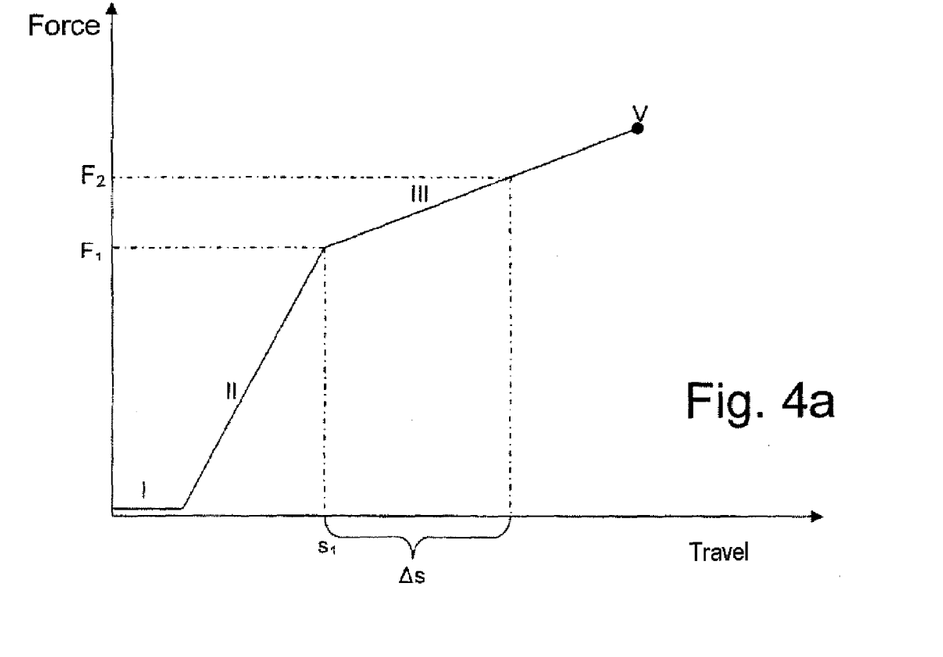
FIG. 4a illustrating the intervention of a spring device.
Figure 4B:
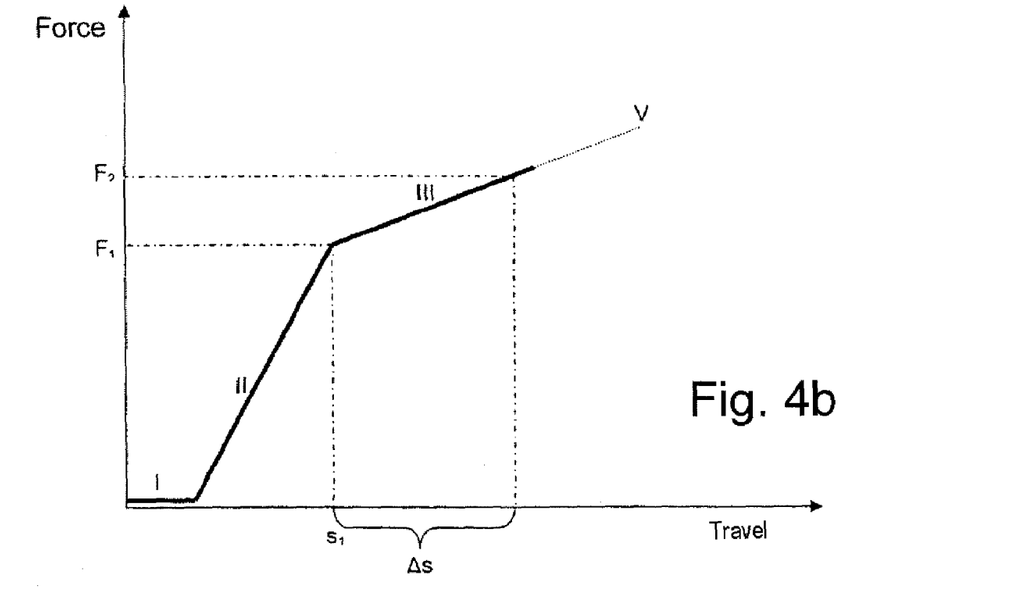
FIG. 4b illustrating the behavior during the locking cycle, and FIG. 4c illustrating the behavior during the cooling of the brake system.
Figure 4C:
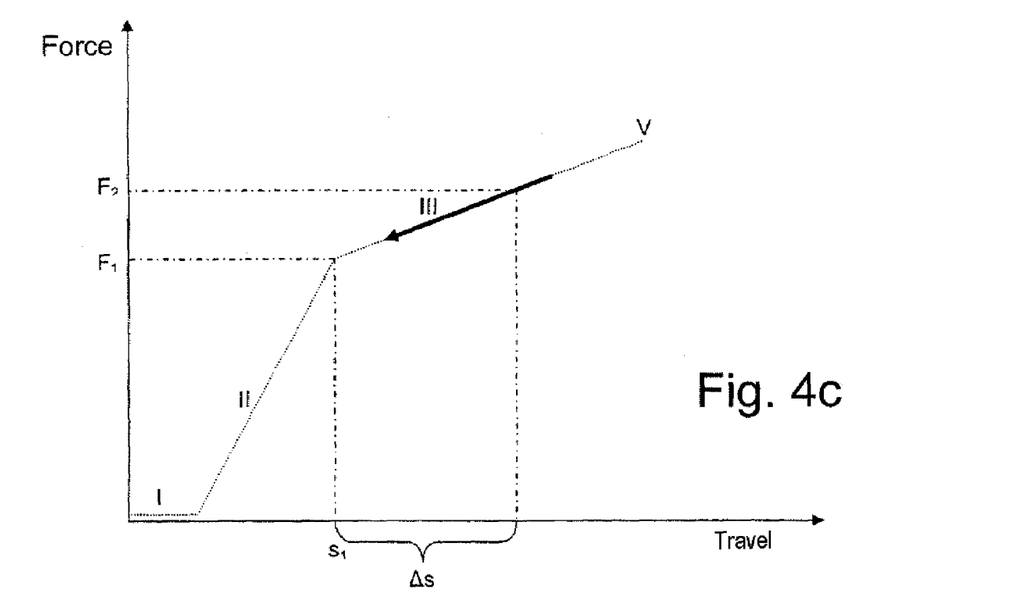
Figure 5A:
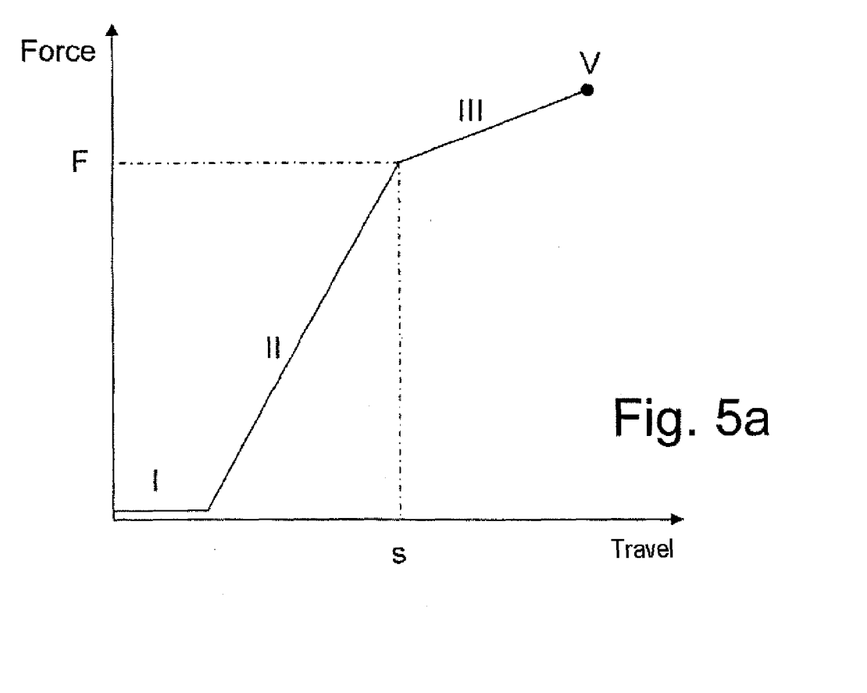
FIGS. 5a-5c: the operation of a spring element in a drum brake system, FIG. 5a illustrating the intervention of the spring device, FIG. 5b illustrating the behavior during the locking cycle, and FIG. 5c illustrating the behavior during the cooling of the brake system.
Figure 5B:
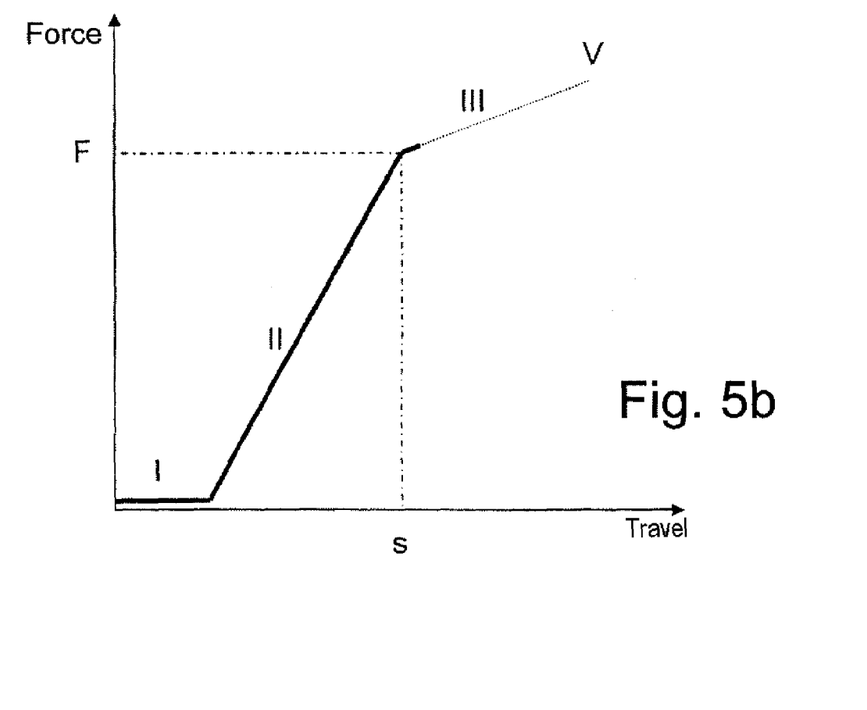
Figure 5C:
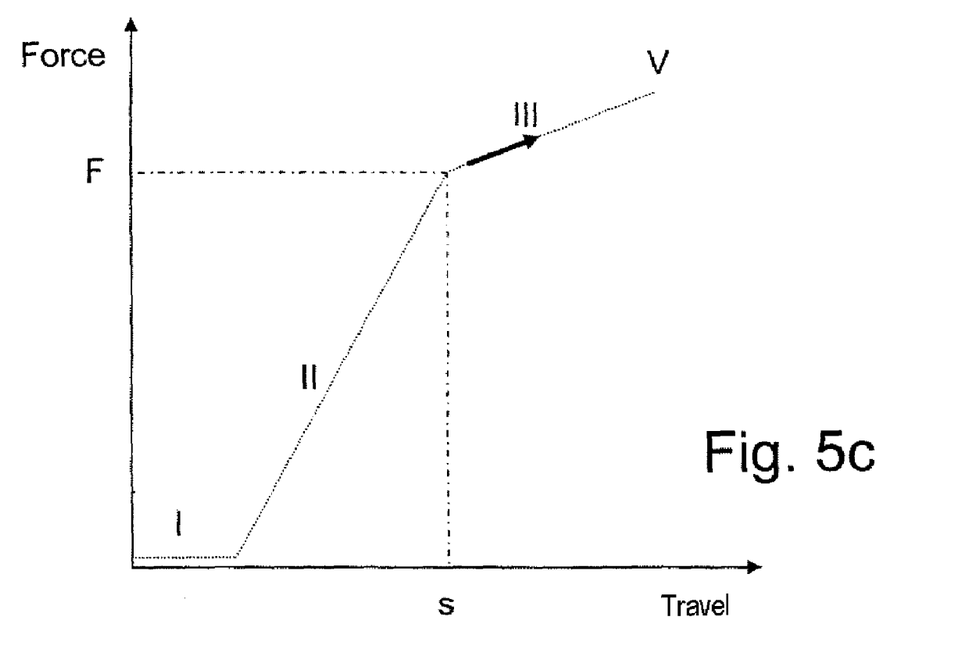

This force equivalent to the preload of the spring device is marked F1 in FIGS. 3 and 4, and F in FIG. 5. The elasticity of the spring device is chosen so that the increase in the compression applied to the spring device is reduced to a minimum and that the force increase above the required braking force is also reduced to a minimum. The force of the spring device at the maximum value of compression which should be adopted for compensating for thermal relaxation in each case of application must be chosen to be less, in the worst case, than the force produced by the force generating device (electric motor) of the automatic parking brake.

In automatic parking brake systems acting on disk brakes, the spring can stretch to compensate for the elongation of the travel due to the thermal relaxation of the braking mechanism, and the braking force will remain, after thermal relaxation, above the required braking force (see FIGS. 3c, 4c).

In automatic parking brake systems acting on drum brakes, the spring device is compressed during thermal relaxation and therefore limits the increase in the force (see FIG. 5c).

The characteristics of the interposition of a spring device in different configurations and different brake circuits will be described in detail with reference to FIGS. 3-5. In different cases of operation, these curves represent the applied braking force plotted against the actuating travel of the brake device.

FIGS. 3a-3c correspond to an automatic parking brake system acting on disk brakes, in which the spring device comprises two stops to limit the travel of the spring.

FIGS. 4a-4c correspond to an automatic parking brake system acting on disk brakes, in which the spring device has only one stop to limit the travel of the spring.

FIGS. 5a-5c correspond to an automatic parking brake system acting on drum brakes.

FIGS. 3a-3c will therefore be described first.

FIG. 3a shows the general operating characteristic of such a device during operation of the automatic parking brake.

The curve in FIG. 3a therefore represents the general characteristic of a system applied to a disk brake in which the travel of the spring device is limited by two stops. This curve can be divided into five different regions labeled I through V.

These regions are obtained in the same way by indirect measurement of the force applied to the brake devices, e.g. from the current supplies to the actuating electric motor.

F1 corresponds to the preload of the spring device which has been defined, according to the invention, as being equal to the minimum braking force required to immobilize the vehicle.

F2 is the amount of force at maximum compression of the spring device (washer at second stop 4).

The travel S1-S2 represents the maximum compression of the spring device defined by the second stop 4. This travel is defined for each application in such a way that the compression (or travel) of the spring device is sufficient to compensate for the travel due to the thermal relaxation of the mechanism. The force of the spring element at the second stop 4 is therefore adjusted with the necessary accuracy.

In region I the force is very low because it corresponds to the dead travel of the brake system which must be overcome.

In region II the force generated by the parking brake is less than the value of the preload of the spring device. The behavior of the parking brake system is determined by the elasticity of the brake calipers and the spring device has no influence.

When the applied force reaches the value of the preload F1 of the spring device, the latter begins to be compressed until it reaches region III.

In region III a visible change occurs in the elasticity of the brake mechanism and a significant change is therefore observed in the slope of the curve compared with the slope in region II.

When the applied force reaches the level of maximum compression of the spring device (no further compression of the spring is now possible) the system arrives in region IV.

In region IV the spring device is no longer active and the behavior is still determined by the disk brake calipers only.

If the force produced by the actuating element of the parking brake (the electric motor, for example) increases to its maximum value (until the actuating motor stops, for example), the system has reached point V where it can no longer increase either the force or the travel.

The characteristic shown in FIG. 3a makes possible a closed-circuit force actuation without the need for a direct force sensor, because the two points of change of elasticity are clearly identifiable by monitoring the slope of the indirect force-measuring function, for example the measurement of the current supplied to the actuating electric motor.

FIG. 3b shows the engagement of an automatic parking brake and FIG. 3c shows the operation during thermal relaxation of the brake device.

FIG. 3b shows the operation of the system of the invention using the curve of the force plotted against travel during one cycle of application of the parking brake.

The force is increased until the second point of change of slope, following region III, is identified by the indirect force measurement. As soon as this second point of change of slope is reached the increase of the force is halted. This ensures that the braking force will remain above the required braking value and will remain steady even after thermal relaxation.

The second stop 4 of the spring device is determined in such a way that the corresponding compression of the spring device is enough to compensate for the travel due to thermal relaxation.

FIG. 3c shows the behavior of the system and in particular the travel of the brake device during cooling. Since the pads and the disk shrink as they cool, the travel and braking force decrease but are limited by the expansion of the spring device so that the braking force always stays above the required braking value F1.

The force values corresponding to the two stops of the spring device are known very exactly (for example during pre-adjustment). These stops can be used to calibrate the indirect force measurement function during each specific application.

The operating curve described above also makes it possible to monitor the components of the parking brake mechanism: the ratio between the values of the force at the two points of change of slope during indirect measurement of the force is equal to the ratio of the preload to the final load of the spring device. The measured values and the ratio between them can be stored in a memory and compared with the design ratios. In this way, any changes in the spring device can be tracked.

The points of change of slope are also recognizable during the application of the braking force and the operating values can be stored. Because the difference between the operating values during application of the force and during release exhibits hysteresis due to the spring and due to the transmission of the force (friction), this hysteresis can be monitored.

Other failure modes can be monitored using the characteristic illustrated in FIGS. 3a-3c. For example, if no change of slope is identified, this means that the spring device is no longer acting as an elastic component or that the maximum force produced by the braking actuating device of the motor (a traction device in a cable system for example) is less than the preload of the spring device.

If only one point of change of slope is identified, this may mean that the elasticity of the spring device has changed or that the force produced by the actuating device is a maximum force which is greater than the preload but less than the maximum load of the spring device. Specifically, if the ratio between the functional values at the points of change of slope has changed, this may mean that the preload of the spring device has changed, or that the elasticity of the spring device has changed, or that the final load of the spring device has changed. If a functional absolute value has changed significantly (compared with the stored values) the reason could be either a change in the characteristic of the device producing the braking force, or a change in the preload of the spring device or of the elasticity of the spring device.

FIG. 4a shows the general characteristic of a spring device fitted with stop 3 only for a system applied to a disk brake, while FIG. 4b shows the behavior of the operation of a parking brake and FIG. 4c a behavior of the system during thermal relaxation.

In general terms the above description of FIGS. 3a-3c is also valid for FIGS. 4a-4c.

FIG. 4a therefore shows a general characteristic of travel plotted against force for a system applied to a disk brake and comprising a spring device with one stop.

This characteristic can be divided into four different regions labeled I, II, III and V. These regions are distinguishable in the same way in the indirect force measurement function (for example current of the actuating motor).

Force F1 corresponds to the preload of the spring device which is also defined as the required braking force.

The travel Δs represents the compression (i.e. the travel) of the spring device which is sufficient to compensate for the travel due to the thermal relaxation of the mechanism.

F2 is the level of force after compression of the spring device through the travel Δs.

Regions I-III of curve 4a correspond to those of FIG. 3a and the preceding description of these regions is applicable to them also. Owing to the absence of stop 4 and therefore to the absence of the limitation on the spring travel, region IV is not present in this characteristic. Region III continues instead of region IV until the actuating device (the electric traction motor in the case of a cable device) produces its maximum force, for example until the motor halts. Since no further increase in force or increase in travel of the spring is possible, region V is reached.

Because the preload of the spring device is known with great accuracy (for example during pre-adjustment), it can be used to calibrate the indirect force measurement function during each specific application. The spring preload which corresponds to the functional value of the indirect force measurement function at the moment when the slope changes value gives a ratio which can be taken to be constant for each function and especially at the higher end of the ranges of forces.

FIG. 4b shows the curve of the force plotted against the behavior of the travel during one parking brake application cycle. At the change of slope the abovementioned ratio is calculated, which makes it possible to calculate the value of force F2. The force is increased until force level F2 is reached, and from that moment the automatic parking brake application cycle can be stopped.

A closed-circuit force actuating without the need for a direct force probe is thus possible. This ensures that the braking force remains above the required braking force even after thermal relaxation because the pressure of the spring device is set so that the force equal to the compression of the spring device is sufficient to compensate for the travel due to thermal relaxation.

FIG. 4c shows system behavior during thermal relaxation. As the pads and disks shrink the braking force and travel decrease but are limited by the expansion of the spring device, so that the braking force always remains greater than the required braking force F1.

If a displacement sensor measuring the travel of the brake device is provided, a system can be built without a force sensor. The system then need simply detect the change of slope between regions II and III and the travel simply has to be measured beyond the point of change of slope.

The abovementioned measurement of travel or a contact sensor enables all monitoring possibilities, such as spring elasticity, force generator as described above in respect of the two-stop device.

The characteristic in FIG. 4a allows the components of the parking brake mechanism to be monitored. The point of change of slope is also identifiable during the release of the braking force and functional values can be stored. A difference may occur between these functional values during actuation of the parking brake and during its release. This difference may be due to hysteresis resulting from the elasticity of the spring device and from that of the brake device. This hysteresis can also be monitored.

Other failure modes can be monitored by means of the characteristic shown in FIG. 4a. If no change of slope is identified it can be assumed that the spring device is no longer acting as an elastic component, or that the device generating the braking force is generating a maximum force which is less than the preload of the spring device. If the absolute value of the functional value has changed significantly (compared with the stored values), the reason may be a change in the characteristic of the braking force generator or in the preload of the spring device.

FIG. 5a shows the general characteristic of a spring device with one stop for drum brake systems. FIGS. 5b and 5c show the behavior during parking brake actuation and during the thermal relaxation process, respectively.

In broad terms, the foregoing description of FIGS. 3a-3c and 4a-4c is applicable to FIGS. 5a-5c.

FIG. 4a shows a general characteristic of travel plotted against force for a system applied to a drum brake and comprising a spring device with one stop.

This characteristic can be divided into four different regions labeled I, II, III and V. These regions are distinguishable in the same way by the indirect force measurement function (for example by measuring the current of the actuating motor).

These regions are distinguishable in the same way by the indirect force measurement function, for example the current supplied to the control motor. F1 is the preload of the spring device which is equal to the braking force required for each application.

Regions I-III are identical to those of FIG. 3a and the above description of those regions is also valid in this application to a drum brake.

Owing to the absence of a limit on the travel of the spring device compared with the arrangement in FIG. 3a, region IV is not found in this characteristic. Region III continues until the motor is providing its maximum force, for example. In this case, no further increase in the force or increase in the travel of the spring is possible when region V is reached.

FIG. 5b shows the curves of force against travel during one parking brake application cycle. As soon as the change of slope at the level of force F is reached the application cycle can be halted. Autonomous force actuation without the use of a direct force sensor is therefore possible. The braking force is thus certain to be reached.

FIG. 5c shows the behavior of force plotted against travel during thermal relaxation. Owing to the shrinkage of the diameter of the drum, the braking force is increased but is limited by the compression of the spring device. The braking force will therefore remain always below the maximum force value determined by the maximum compression of the spring device due to thermal relaxation.

Because the preload of the spring device is accurately known (for example from the spring device pre-adjustment procedure), it may be possible to calibrate the function of indirect measurement of the brake actuating force for each type of application.

The characteristic shown in FIG. 5 allows the components of the parking brake mechanism to be monitored. Thus, the point of change of slope is identifiable during both actuation and release of the parking brake. Differences related to the hysteresis of the system can occur between actuation and release of the parking brake. This hysteresis can be monitored.

As before, different failure modes can be monitored by using the characteristic depicted in FIG. 5a.

If no change of slope is identified, this may mean that the spring device is no longer acting as an elastic component, or that the braking force generating device (the motor) is generating a maximum force which is less than the preload of the spring device. If the absolute value of the functional value has changed significantly (compared with the stored values), the reason could be a change in the characteristic of the braking force generator or of the preload of the spring device.

The characteristic shown in FIG. 4a enables the components of the parking brake mechanism to be monitored. The point of change of slope is also identifiable during the release of the braking force and functional values can be stored. A difference may occur between these functional values when putting the parking brake on and when releasing it. This difference may be due to a hysteresis due to the elasticity of the spring device and that of the brake device. This hysteresis can be monitored.

Other failure modes can be monitored by means of the characteristic shown in FIG. 4a.

In addition, by using additional probes, other failure modes can be monitored. With for example a travel probe, the elasticity of the spring device can be monitored.

The monitoring described above of the indirect force measuring function allows a closed-circuit force actuation without the need for a direct force sensor.

Since the elasticity of the spring device is stable over time, the level of the force arrived at is independent of the variation of the parameters of the indirect force measurement function.

Braking force is estimated with high and reproducible precision under all conditions.

Software could be used to perform the above controls and detect operation of the parking brake in the absence of the command from the driver so that an alarm can be sent in the event of faulty operation.

Changes of slope in the indirect measurement of force operating during application or release of the parking brake are detectable regardless of the applied hydraulic pressure value in the service brake mechanism.

Additional probes can be used to provide additional information about, for example, the force or travel, and to provide more extensive monitoring of the components and/or of closed-circuit actuation.

The invention claimed is:

1. Method of actuating an automatic parking brake for a vehicle, said brake comprising a spring device, designed to absorb actuating forces, situated in an actuating mechanism of a brake device, said method being characterized in that it comprises at least the following steps: application of a preload to said spring device, adjustment of this preload to a level corresponding at least to a minimum braking force required for said vehicle, a step of indirectly measuring the brake actuating force, and a step of locking the parking brake when said brake actuating force is greater than a force whose value is equivalent to said preload.

2. Method of adjustment according to claim 1, characterized in that it comprises the following steps: a step of measuring a displacement ($\Delta s$) of the spring device, and a step of locking operation of the automatic parking brake when said displacement reaches a defined value.

3. Method of adjustment according to claim 1, characterized in that it involves limiting travel of the spring device to a value chosen to produce a defined value of the locking force.

4. Method of adjustment according to claim 1, characterized in that the automatic parking brake is controlled by an electric brake and the step of measuring the braking force is carried out by measuring current supplied to said electric motor.

5. Method of adjustment according to claim 1, characterized in that it comprises a step of generating a curve of the actuating force communicated to the brake device as a function of travel of the actuating device.

6. Method of adjustment according to claim 1, characterized in that it comprises a step of monitoring slopes of said curve to ensure that changes of slope occur at moments when the applied force is equal either to the preload force or to a force equal to maximum compression of the spring device.

7. Method of actuation according to claim 5, characterized in that it involves calculating and storing in memory ratio between the values of the actuating forces communicated to the brake device measured at the changes of slope of said curve.

8. Method of actuation according to claim 7, characterized in that it involves, when the parking brake is actuated, measuring the actuating forces communicated to the brake device at the changes of slope of said curve, and comparing the ratio between these values with said stored ratio.

9. Automatic parking brake system applying the method according to claim 1, characterized in that it comprises at least one brake device with a spring device inserted into the actuating mechanism of said brake device, the spring device being preloaded to a force corresponding to the required minimum braking force (F1, F).

10. System according to claim 9, characterized in that it comprises at least one cable (9) for transmitting the brake actuations to said brake device, said spring device being inserted into said cable (9).

11. System according to claim 9, characterized in that it comprises a cylindrical jacket (7) containing a spring (1) situated on the axis of the jacket between a first end and a second end of the jacket, the first end possessing a plug (6) through which the cable and a cable sheath end pass, which spring (1) bears against an axially moveable washer (3) which itself bears against the plug (6) or against said sheath end (8), the plug or the sheath forming a first stop, and the second end of the jacket possessing an axially moveable cover (5) for adjusting the spring (1) preload in conjunction with the first stop (3).

12. System according to claim 11, characterized in that the cover (5) is screwed onto the second end of the jacket.

13. System according to claim 11, characterized in that the jacket comprises a second stop (4) making it possible to limit the displacement of the washer (3) in compression mode.

14. System according to claim 9, characterized in that the spring device is inserted into the disk brake piston.

15. System according to claim 14, characterized in that the spring device comprises a first stop (14) for defining the preload.

16. System according to claim 15, characterized in that the spring device comprises a second stop (15) which limits the travel of the spring device.

* * * * *